United States Patent
Carr et al.

(10) Patent No.: US 6,600,744 B1
(45) Date of Patent: Jul. 29, 2003

(54) METHOD AND APPARATUS FOR PACKET CLASSIFICATION IN A DATA COMMUNICATION SYSTEM

(75) Inventors: David W. Carr, Nepean (CA); Paul Nadj, Ottawa (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/274,720

(22) Filed: Mar. 23, 1999

(65) Prior Publication Data (65)

(51) Int. Cl.[7] ................................................ H04L 12/28
(52) U.S. Cl. ..................... 370/392; 370/412; 709/240
(58) Field of Search ............................... 370/389, 392, 370/412, 428, 465, 466, 218; 709/230, 238, 228, 240

(56) References Cited

U.S. PATENT DOCUMENTS

| 6,104,696 | A | * | 8/2000 | Kadambi et al. | ............ | 370/218 |
| 6,157,955 | A | * | 12/2000 | Narad et al. | ................ | 709/228 |
| 6,167,047 | A | * | 12/2000 | Welfeld | ........................ | 370/389 |
| 6,167,445 | A | * | 12/2000 | Gai et al. | ................... | 709/223 |
| 6,341,130 | B1 | * | 1/2002 | Lakshman et al. | .......... | 370/389 |
| 6,430,184 | B1 | * | 8/2002 | Robins et al. | .............. | 370/392 |

OTHER PUBLICATIONS

"High–Speed Policy–based Packet Forwarding Using Efficient Multi–dimensional Range Matching," Laskhman, et al; Comput. Commun. Rev.; vol. 28, No. 4, pp. 203–214, Oct. 1998.

"Fast and Scalable Layer Four Switching," Srinivasan, et al; Comput. Commun. Rev.; vol. 28, No. 4, pp. 191–202, Oct. 1998.

* cited by examiner

Primary Examiner—Hassan Kizou
Assistant Examiner—John Pezzlo (57) ABSTRACT

A method and apparatus for packet classification stores rules or parameters for classifying the packets in a memory structure. The memory structure receives a set of rule selection signals, where the memory provides a selected set of rules in response to the rule selection signals. A comparison block operably coupled to the memory receives a key, which is also preferably derived from the header information for the packet. The key includes the relevant information for classifying the packet according to the rules stored in the memory. The comparison block compares the key with each of the rules in the selected set of rules, and when a favorable comparison is determined, the comparison block provides an indication of the favorable comparison. A prioritization block operably coupled to the comparison block prioritizes the rules that resulted in a favorable comparison to determine a preferred rule, where the preferred rule includes the resulting classification information for the packet.

31 Claims, 5 Drawing Sheets

METHOD AND APPARATUS FOR PACKET CLASSIFICATION IN A DATA COMMUNICATION SYSTEM

FIELD OF THE INVENTION

This invention relates generally to data communications and more particularly to packet classification in data communication systems.

BACKGROUND OF THE INVENTION

Data in data communication systems are often transported in packet form. Packets include data and headers that direct the packet through the data communications network to its final destination. Routing information and other properties, such as billing information and priority, is often extracted from the packet by examining the headers at various points in the network. This type of packet classification by switches and other entities within the data communications network can require a great deal of processing bandwidth and also introduce latency in the system if it cannot be accomplished in a timely manner.

The header information of the data communications packet typically includes a source address that indicates the source of the data communications packet, a destination address that indicates the intended receiver of the packet, the particular protocol that is being used to transport the data, and other relevant information used to determine how the data packet should be treated throughout the data communication system. In order to classify the data packet and determine how it should be dealt with, the header information is examined. In a firewall application, the header information may be utilized to determine whether or not data can be passed through a particular link in the data communications system. If the packet is passed, it must be prioritized relative to other packets destined for the same link, which may be based on the class of service. In other applications, the header information may be used to determine billing information such as the cost of sending the data packet and which party is to be billed.

Data communication protocols are often structured using a number of different layers, where each layer may include a number of parameters associated with a particular data packet. Typically, these parameters are included in the header of the data packet. Thus, the parameters contained in the header of the data packet can be significant. These parameters must be efficiently assessed and processed in order to properly utilize them for routing and other data classification purposes.

Prior art solutions to the problem of filtering or classifying packets using the large amount of information contained in the packet headers include mathematically elegant solutions that are able to sort through the data in the packet header. However, these prior art solutions typically encounter problems with memory usage. In many cases the large amount of memory required to store the classification parameters required to properly analyze incoming packets renders these solutions impractical for most applications. Although the use of cache memories can help alleviate some of the obstacles created by large memory requirements, the bandwidth required to update the contents of the cache render these solutions impractical.

Similarly, in systems that have more reasonable memory requirements, the algorithms required to perform the packet classification are time consuming to the point where the delay introduced is detrimental to the system performance.

In addition to this, the parameters used for classification in these systems are often stored in such a way that it is difficult to modify the classification parameters, or rules. Because the parameters used to classify the packets are often dynamic, the ability to easily modify the parameters is important in most applications.

Therefore, a need exists for a method and apparatus for packet classification that requires a limited amount of memory, is able to perform the classification in a timely manner, and allows for easy modification of the rules, or classification parameters.

DETAILED DESCRIPTION OF A PREFERRED EMBODIMENT OF THE INVENTION

Generally, the present invention provides a method and apparatus for packet classification. The rules or parameters for classifying the packets are stored in a memory structure. The memory structure receives a set of rule selection signals, and provides a selected set of rules to a comparison block in response to the rule selection signals. The comparison block also receives a key that includes the relevant information for classifying the packet according to the rule set stored in the memory. The key is also preferably derived from the header information for the packet. The comparison block compares the key to each of the rules in the selected set of rules, and when a favorable comparison is determined, the comparison block provides an indication of the favorable comparison. A prioritization block operably coupled to the comparison block prioritizes the rules that resulted in favorable comparisons to determine a preferred rule, where the preferred rule includes the resulting classification information for the packet.

By implementing the packet classification engine using a memory that stores many rules and provides a large number of these rules to the comparison block in parallel, many rules can be compared with the key simultaneously. The prioritization block allows the results of the parallel comparison to be organized such that the proper rule, or a set of resultant data associated with that rule, is provided as the classification result.

The packet classification engine described herein may be implemented using dynamic random access memory (DRAM) technology, which allows for a low-cost, high-performance implementation. The rule set stored within the memory structure may be modified through a simple memory access that alters the specific rules within memory. Additionally, the signals utilized to select the set of rules for a particular comparison can be mapped to different locations within the memory structure, thus allowing different sets of rules to be utilized in different sets of conditions. Similarly, the mapping of the rule selection signals to a specific set of rules is flexible enough that a plurality of different rule sets can be included in the memory structure, allowing a variety of protocols to be supported in a single packet classification engine.

Further flexibility is achieved through a configurable comparison block that allows for configurable comparisons between the received key and the rule sets stored in the memory. Additionally, the packet classification engine can be structured such that multiple matches between the key and the rule set are determined for each key value. Thus, one class of rules may be utilized to determine the billing class for a packet, whereas another class of rules may be used to determine the forwarding characteristics for the packet. Furthermore, because the comparison between the key value and the sets of rules is performed in large parallel scale, in many applications the comparisons required to classify a packet can be performed with a single access to the memory.

Figure 1:
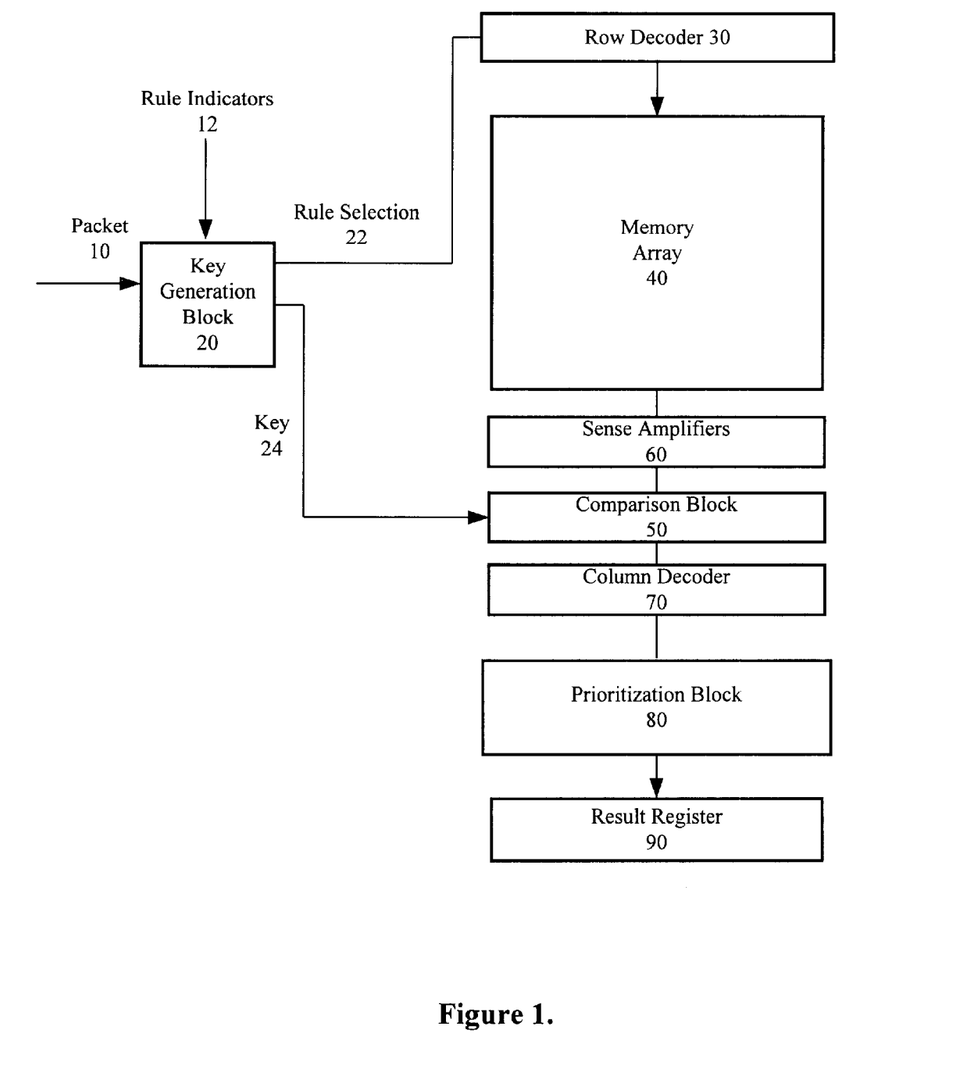
FIG. 1 illustrates a block diagram of a packet classification engine in accordance with the present invention.

The invention can be better understood with reference to FIGS. 1–5. FIG. 1 illustrates a packet classification engine that includes a memory array 40, a comparison block 50, and a prioritization block 80. The memory, or memory array 40, stores a plurality of rules, where each rule defines a region in an N-dimensional space, where N is a number typically greater than eight. The N-dimensional region for each rule is defined by the N parameters within each rule. For example, a rule may include parameters such as a source address range, a destination address range, and the like. Each of these parameters defines a region within a particular dimension of the N-dimensional space, and the combination of all of the in parameters defines a corresponding region within the N-dimensional space.

A set of rules, which includes at least one rule, is selected from the memory array 40 and provided to the comparison block 50. Selection of the selected set of rules is performed based on a set of rule selection signals 22. The rule selection signals 22 may originate from a variety of sources based on the particular application or system in which the packet classification is being performed. The rules selection signals 22 may be received via the interface over which the packet to be classified was received. Such an interface may be a physical or logical port such as is present in an ATM or Frame Relay switched virtual connection. In other embodiments, the rule selection signals 22 may be determined based on additional rule indicators 12, including the direction (ingress/egress) the packet is flowing; the protocol of the packet, which may or may not be present in the packet or key, and may be implied by the interface; or the source address, destination address, or a tag internal to the packet.

Preferably, the rule selection signals are provided to a row decoder 30 that selects the selected set of rules. The row decoder 30 decodes the rule selection signals 22 and provides row selections signals to the memory array 40. In response, the memory array 40 provides the data elements contained within the row specified by the row selection signals to the comparison block.

Preferably, the comparison block 50 is coupled to a set of sense amplifiers 60, where a sense amplifier is positioned at the base of each column in the memory array 40. The sense amplifiers determine the state of the bit in the selected row of each of the columns of the memory array 40 and provide this information to the comparison block 50. The use of sense amplifiers to determine the state of data bits in memory structures is well known in the art.

The comparison block 50 is operably coupled to receive a key 24, where the key defines a specific point within the N-dimensional space. Preferably, the key 24 and the rule selection signals 22 are generated by a key generation block 20. The key generation block 20 receives the packet 10, or at least the relevant header information for the packet, and extracts fields from the header to generate the key. Various portions of various fields may be used to generate the key that is appropriate for the particular classification operation. As stated earlier, the rule selection signals 22 may be determined based on a number of different factors related to the packet.

The comparison block 50 compares the key 24 to the selected set of rules received from the memory array 40. The comparison block 50 performs this comparison in parallel, such that all of the rules included in the row of data from the memory array 40 are simultaneously compared with the key 24. When the comparison block 50 determines a favorable comparison between the key 24 and one of the rules in the selected set of rules, the comparison block 50 generates an indication of the favorable comparison. A favorable comparison between the key 24 and one of the rules in the selected set of rules indicates that the point defined by the key 24 in the N-dimensional space lies within the region defined by the rule in the N-dimensional space.

Because each of the rules defines a region in the N-dimensional space rather than a unique point, the key 24 may define a point that lies within a number of different regions defined by a number of different rules. In order to determine which of the rules best classifies the packet received, the packet classification engine includes the prioritization block 80. The prioritization block 80 is operably coupled to the comparison block 50, and receives the indications of favorable comparisons. The prioritization block 80 determines a preferred favorable comparison from the indications of favorable comparisons, resulting in a preferred rule being determined from the plurality of rules. When the comparison block 50 determines that the key 24 matches a number of the rules in the selected set of rules, the prioritization block 80 will determine which of the rules is used to classify the packet. Preferably, the rules are stored in the memory array 40 in an ordered pattern such that the first favorable comparison determined by the comparison block 50 results in the preferred rule.

Preferably, each of the rules stored in the memory array 40 includes result data corresponding to that particular rule. When the rules are used for comparison with the key 24, and a rule is determined as the preferable rule, the result data corresponding to that rule is included in the output of the packet classification engine. For example, if a packet is classified based on its destination address, the results of a favorable comparison with a rule in the memory array 40 may be to allow the data communication packet to pass through the switch making decisions based on the packet classification. In such a case, the results stored with the rule in the memory array 40 would be a result indicating that the data packet should be passed. In another example, the result stored with the rule in a memory array may include billing information, such as a billing rate and the individual or entity which is to be billed.

Preferably, the result data corresponding to the preferred rule as determined by the prioritization block 80 is stored in, or copied to, a result register 90. The result register 90 allows a processor requesting the packet classification to obtain the results by reading the data stored in the result register 90. In other embodiments, the result data may be provided to a data bus, or used to drive a set of output signals used to communicate the result to the processor requesting the packet classification. A plurality of request and result registers may be provided in either a first-in-first-out (FIFO)

format or registered fashion to alleviate any latency associated with loading of key data, retrieving results, or extended comparison times for long rule sets.

Preferably, the memory array 40 is a dynamic random access memory (DRAM) structure. In order to facilitate utilization of a DRAM structure for the comparison purposes of the present invention, the rule selection signals 22 select a particular row of data within the memory array 40. In a standard DRAM structure, an additional set of column decoding signals select a specific column within the selected row. In the embodiment illustrated in FIG. 1, the column decoder block 70 is preferably utilized for rule examination and modification by a control processor.

Upon initialization, the set of rules to be utilized for packet classification is stored in the memory array 40. Preferably, the rules are stored in the memory array 40 using the column decoding block 70 and the row decoder 30 in a manner consistent with typical DRAM memories. The column decoding block 70 and row decoding block 30 may also be employed to add or modify rules stored in the memory array 40.

By storing a large number of packet classification rules in the memory array 40 and providing a plurality of these rules to the comparison block 50 in parallel for comparison with the key 24, a plurality of comparison operations can be performed simultaneously. The prioritization block 80 allows multiple matches determined by the comparison block 50 to be prioritized such that the preferable rule is selected. The result data included in the memory array 40 corresponding to the preferred rule is included in the output of the packet classification engine. The output result determines various characteristics of the packet that can be used by switches or other data communications devices for routing, billing, security, and other purposes.

An alternate embodiment places the comparators after the column decoder. This arrangement takes advantage of the burst capabilities of the DRAM. A column access to a selected row is often an order of magnitude faster than selecting a random row. Thus, fewer rules may be burst-read sequentially and provided to a smaller number of comparators. This embodiment reduces complexity and cost at the cost of a small performance penalty. The reduction in complexity includes a need for fewer comparators and reduced bus widths.

Figure 2:
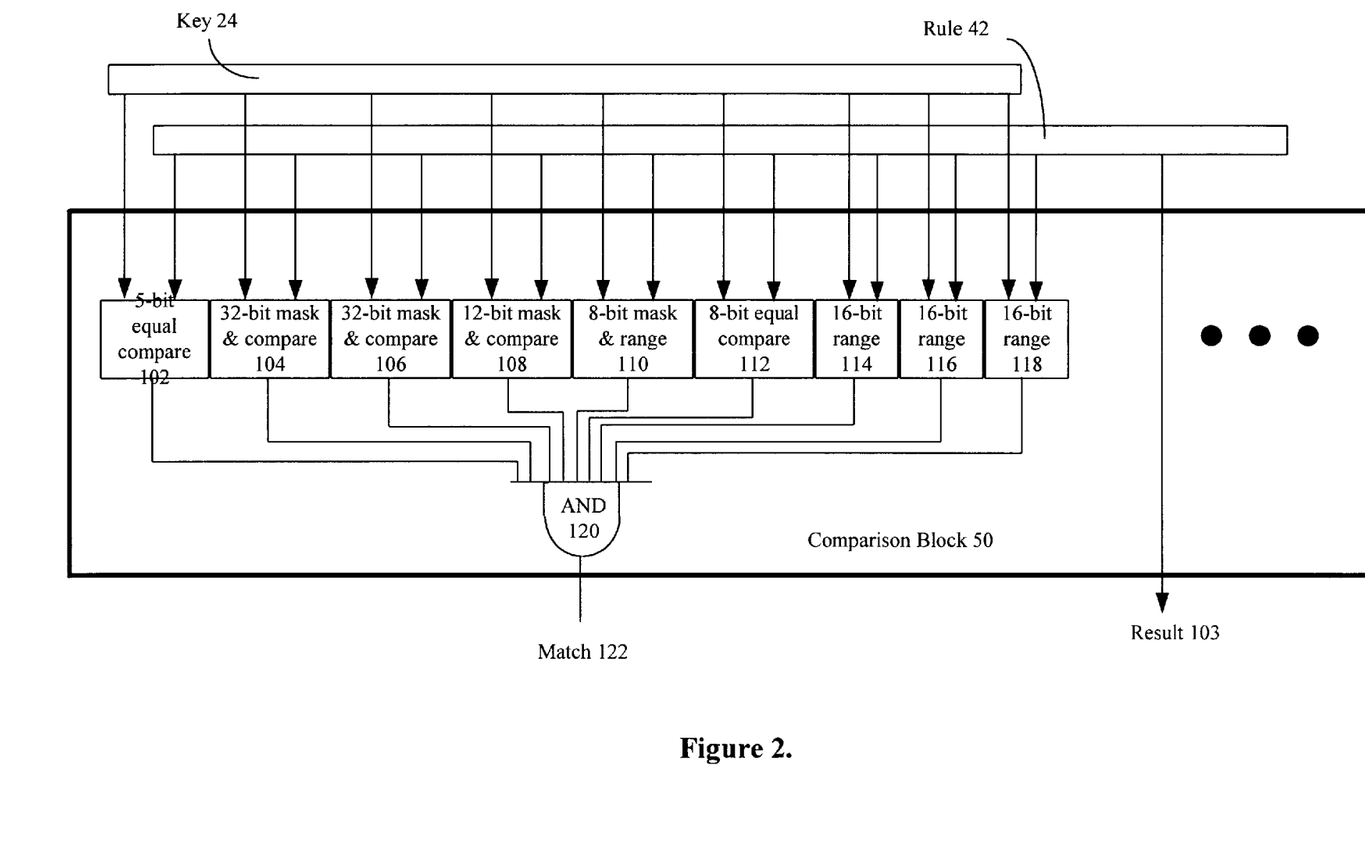
FIG. 2 illustrates a schematic block diagram of a comparison block in accordance with the present invention.
Figure 3:
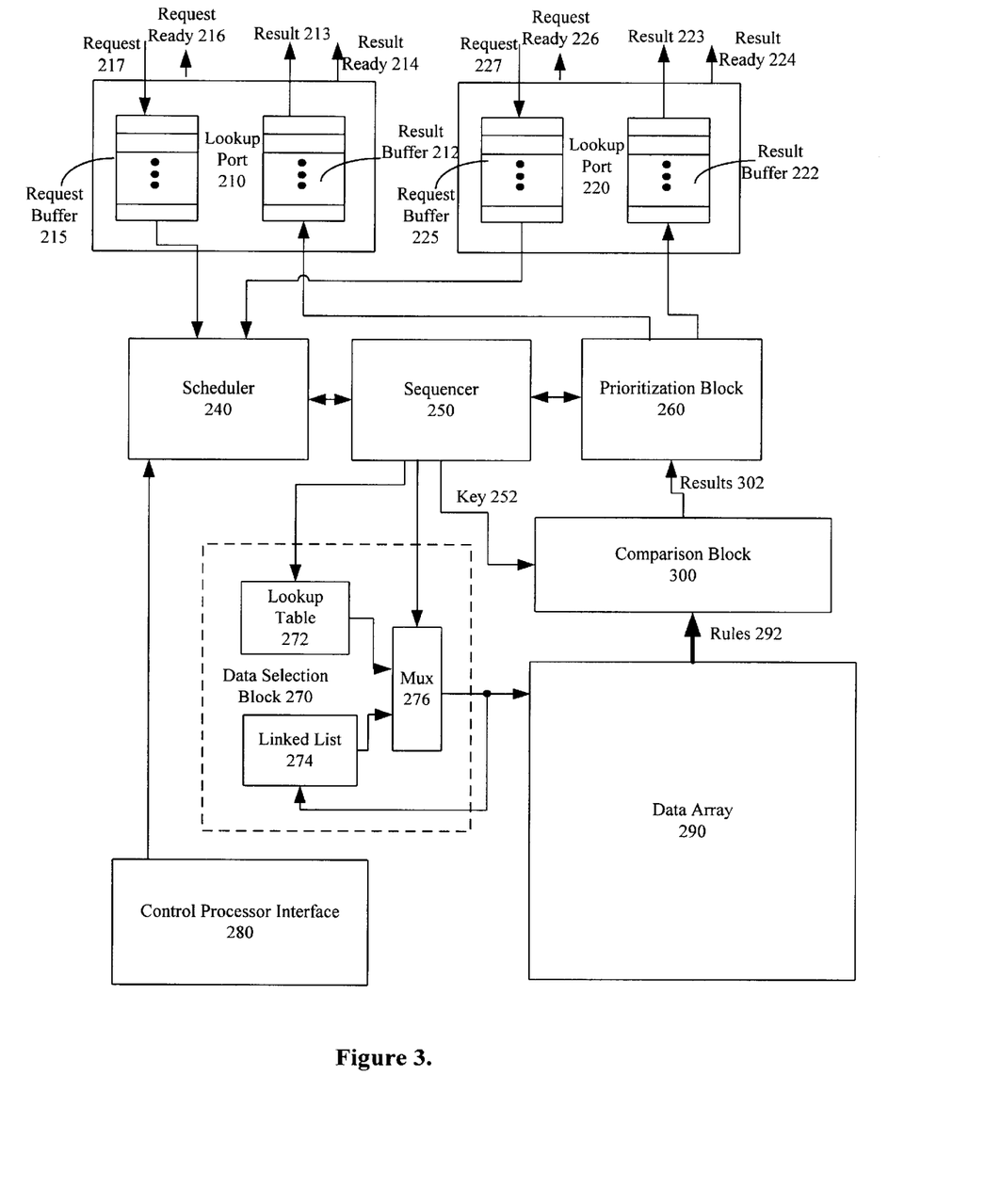
FIG. 3 illustrates a block diagram of another packet classification engine in accordance with the present invention.

FIG. 2 illustrates one embodiment of a comparison block 50 that can be utilized with the packet classification engines illustrated in FIGS. 1 and 3. The comparison block 50 illustrated in FIG. 2 is optimized for processing of Internet Protocol (IP) data packets. The set of comparators included in the comparison block 50 is optimized for performing comparisons between a key value generated from a IP packet header, and one particular set of rules utilized to classify such a packet. It should be noted that the specific set of comparators included in a comparison block 50 may be adjusted or configured to suit a specific protocol. The same set of comparators may be used for other protocols, albeit with some limitations.

In other embodiments, a flexible set of comparators can be included within the packet classification engine, where comparison of different bits in the key and rules is controlled by routing the bits to the configurable set of comparators. A flexible mapping of bits from the key and rule to the comparators allows for numerous protocols to be supported within a single packet classification engine.

Additionally, more flexibility can be achieved within the packet classification engine by including extra comparators in the comparison block 50, where only a portion of the comparators within the comparison block are used for a single comparison. Thus, an overabundance of comparators may be provided to allow maximum flexibility in the types of comparisons performed. Specific bits, or comparison selection data, within the key or a rule may be used to control how the comparators of the comparison block are mapped to the specific portions of the key or rule. Preferably, such control bits are included in the key value, as including the bits in each rule would require additional memory.

Thus, multiple comparators may be applied to particular portions of the key and corresponding portions of each rule of the selected set of rules, wherein each of these multiple comparators produces a partial comparison result. In other words, the same portions of the key and rules are provided to more than one type of comparator. One of the resulting partial comparison results is then selected by comparison selection data in either the key or the rules, where the partial comparison result is taken into account in the overall comparison between the rules and the key. This can allow for smaller keys and rules, while preserving some configurability. For example, the rules and key may include three comparison portions, or fields, that are each provided to an equality comparator and a range comparator. Additional selection data then determines which of the two comparisons for each field is relevant for the particular classification operation.

Additional flexibility can be achieved in a system that includes a static set of comparators by arranging the bits within the key and the rule to facilitate optimal usage of the fixed set of comparators. For the comparators illustrated in FIG. 2, portions of the key and rule which describe a parameter for which an exact match is required are mapped to the most significant portion of the key and rule such that the 5-bit equal compare block 102 compares those specific bits. Similarly, portions of the key and rule compared based on a range comparison are mapped into the less significant portion of the key and rule such that they are compared using one of the 16-bit range comparators 114, 116, and 118.

In additional to the flexibility provided by flexibly mapped comparators, the width of a particular comparison block may be increased or decreased by including additional sets of comparators in the comparison of a particular rule and key. In implementations that include a fixed set of comparators, the width of a comparator may be effectively doubled by chaining adjacent comparators or sets of comparators such that two or more sets of comparators are utilized to perform the comparison between a single key and a single rule. The concatenated, or chained, comparators allow comparisons having a concatenated comparison width that is greater than the maximum non-concatenated width associated with non-concatenated comparisons utilizing non-concatenated comparators. The flexibility provided by the comparison block allows the packet classification engine to support a number of different protocols, including IP, IPX, AppleTalk, etc. In addition, various encapsulation formats can be supported, such as Ethernet, ATM, frame relay, PPP, and the like.

The comparison block illustrated in FIG. 2 is shown to include the set of comparators required to perform the comparison between the key 24 and a single rule 42. It should be noted that in practice, the comparison block 50 typically includes a number of such sets of comparators, where the number is equivalent to the number of rules provided to the comparison block 50 by the memory in a single memory access.

In one particular example, a 64 megabit (Mb) synchronous DRAM (SDRAM) is used to store the rules in a packet classification engine. A typical 64 Mb SDRAM is internally organized to include four banks of memory. Each of the banks includes 4,096 rows of 4,096 bits, where the 4,096 bits in a row are organized into 256 16-bit words. In such an implementation, access to one row in each of the banks of memory will be achieved using a single set of rule selection signals. Thus, 4×4,096 bits, or 16 K bits will be retrieved for comparison in a single memory cycle. Assuming that a single rule can be stored using 256 bits, it is possible to perform 64 parallel comparisons during a single memory cycle. In order to perform the 64 parallel comparisons, 64 of the comparison blocks as illustrated in FIG. 2 will be included in the system—16 for each bank of the memory. If fewer bits are needed to adequately describe a rule, even more comparisons can be performed during a single memory access.

In many applications, comparison of the key with 64 different rules is adequate to determine the classification data required for a particular packet. However, in some cases where the number of rules, or the complexity of the rules, is such that the number of comparisons available in a single memory access is not adequate, additional sets of rules may be fetched from the memory array for comparison with the key value. This operation will be discussed with respect to FIG. 3 below.

The comparison block 50 illustrated in FIG. 2 includes comparators that perform different types of comparisons on the information in the key 24 and the rule 42. The 5-bit equal compare block 102 determines whether or not the five bits received from the key 24 exactly match the five bits of data received from the rule 42. This type of a comparison is often applicable for protocol selection. Such protocol selection determines whether or not a rule applies to IP, IPX, Appeltalk, etc. The five bit equal compare block 102 may also be used to disable rules. The 8-bit equal compare block 112 also determines whether or not an exact match occurs between two sets of eight bits. A ninth bit may be included with the rule to indicate a "don't care" such that any key value will match the rule for this particular portion of the comparison.

The 32-bit mask and compare blocks 104–106 and the 12-bit mask and compare block 108 perform a masking function on some of the bits which they receive from one or more of the key 24 and the rule 42 before performing a comparison between the bits. The mask function allows certain bits within the comparison to be disregarded. These comparison blocks are often useful in performing address comparisons.

The 8-bit mask and range block 110 performs a similar masking function, but compares the bits from one of the two input sets that it receives with a range determined by the other 8-bit set. Thus, a favorable comparison would be determined by the 8-bit mask and range block 110 when certain bits within one of its sets of inputs are found to be within a range defined by the bits included in the other input. The three 16-bit range comparators 114–118 allow 16-bit values within the key 24 to be compared with a range determined by 16-bit values from the rule. The range comparisons are typically associated with layer 4 port numbers.

The outputs of all of the comparators are combined by the AND gate 120 such that all of the comparators must determine a favorable result to produce a match 122 between the key 24 and the rule 42. Preferably, any of the comparison blocks can be disabled such that that block is disregarded in the overall comparison operation. This may be accomplished by including wildcard bits in the equal comparators, selecting a comparison value that is assured of being within/outside of any range comparison (highest or lowest possible values), masking off all of the bits in a mask and compare/range block, etc. As stated earlier, the set of comparators illustrated in FIG. 2 is optimized for a specific application involving IP packet filtering, and it should be understood that other variations of this set of comparators will be appropriate for different applications. Similarly, additional comparators may be included to allow for more granularity in the filtering or classification process.

The result value 103 associated with the rule 42 is utilized in addition to the output of the AND gate 120 to determine the eventual result of the parallel comparison being performed within the comparison block 50. If the AND gate 120 determines that a match has occurred between the key 24 and the rule 42, and it is determined that the rule 42 is the preferred matching rule when more than one rule compares favorable with the key 24, the result 103 will be included in set of data utilized to describe the packet classification.

FIG. 3 illustrates another embodiment of a packet classification engine that includes a data array 290, a data selection block 270, a comparison block 300, and a prioritization block 260. The data array stores a plurality of data sets, where each of the data sets is preferably a rule used for handling or characterizing data packets in a data communication system. Preferably, the data array 290 is structured as a memory array, and more preferably, as a random access memory structure. As such, each of the rows within the data array 290 includes a number of data sets for comparison with a received key value 252.

The data selection block 270 is operably coupled to the data array 290 and selects a selected set of the data sets from the plurality of data sets stored in the data array 290. The data selection block 270 selects the selected set of data sets using a set of row selection signals that select one of the rows in the data array 290. Each of the rows within the data array 290 is assumed to include at least one data set for comparison.

The row selection signals provided to the data array 290 to select the selected set of data sets may be determined using one or more of the lookup table 272 and the linked list 274. The lookup table 272 is operably coupled to receive a start index that corresponds to the start of a set of rules to be used for comparison with a received key value 252. In an embodiment where a data packet is to be characterized, the start index may be included in the key value, or may be provided based on other information. The lookup table 272 determines an offset based on the start index, where the offset is used to generate the row selection signals provided to the data array 290. Thus, the lookup table 272 is used for an initial selection of data sets from the data array 290 for comparison with the received key value 252.

If the key value 252 does not compare favorably with any of the rules, or initial data sets, in the initial selected set of rules determined by the start index, additional rules in another row of the data array 290 may be retrieved for comparison purposes. The linked list 274 receives the address offset, or row selection signals, utilized to select the most recent set of rules provided to the comparison block, and determines a subsequent offset based on the previous offset. The subsequent offset is then provided to the data array 290 to select the subsequent set of rules to provide to the comparison block 300.

Effective use of the lookup table 272 and the linked list 274 allows for flexible mapping of the received start index to the sets of rules contained in the data array 290. A modification to the offset generated in response to a start index in the lookup table 272 can change the entire rule set utilized for comparison with a particular data packet. One application where this may be beneficial is when using a time of day parameter in determining whether or not certain data packets should be passed. For example, during business hours a particular user may not be allowed to receive data packets from a particular source. However, when business hours are over, the lookup table could be updated to point to a new set of rules that allow for such data packets to be passed. As such, data packets associated with a specific source or specific protocol may be disallowed during certain times of day, and allowed during other times of day. All of the rules associated with both of these rule sets may be stored in the data array 290, and the set of applicable rules used for characterization of the data packets may be altered by simply modifying a entry in the lookup table 272.

In a similar manner, the linked list 274 can be used to modify the number of rules to be applied in a specific classification operation. If additional rules are to be used for comparison, the linked list 274 can be appended to include the starting address of the additional set of rules. Note that the additional rules could also be included in the middle of a list of rules through manipulation of the linked list 274. Similarly, the linked list 274 may store a termination character, or other indication that specifies that the rules to be applied for a particular characterization operation have been exhausted, and no additional rules are to be provided from the data array 290.

Preferably, the rules are stored in the data array 290 such that comparison within the comparison block 300 is optimized based on the set of comparators included in the comparison block 300. As was described with respect to FIG. 2, the comparison block 300 preferably includes a number of comparators that may be flexibly mapped to the rule set 292, and the key value 252. In embodiments where the set of comparators within the comparison block 300 is fixed, the organization of the bits within the rules and the key is important to determine the type of comparison performed within the comparison block 300. For example, if the most significant bits of the rule are compared with the most significant bits of the key in an equal comparator the data fields included in the most significant bits of the key and the rules should be of the type where an exact match is needed. As stated earlier, additional bits may be included in each of the rules, or data sets, in the data array 290 to allow for concatenation of individual rules to result in a double length rule for comparison. When such concatenation occurs, only half as many comparisons can be performed in a single memory cycle as is possible in a single rule length comparison.

The comparison block 300 is operably coupled to the data array 290 and receives the selected set of data sets, or rules 292, and compares the rules 292 with the key data set 252. Preferably, the comparison block 300 includes a plurality of flexible comparators as described with respect to FIG. 2, and more preferably, the comparison block 300 includes comparison blocks such as equality comparators, range comparators, mask and compare comparators, and mask and range comparators. For each set of configurable comparators used to compare the key data set 252 with one of the rules 292, the results of the comparators are merged together to determine whether or not the particular rule matches the key 252.

The results 302 of the plurality of parallel comparisons in the comparison block 300 are provided to the prioritization block 260. The prioritization block 260 prioritizes the comparison results to determine a preferred matching data set having a favorable comparison with the key data set. Thus, the prioritization block 260 sorts through the favorable results from the comparison block 300 to determine the preferred rule from the data array 290 that matches the key value 252. Preferably, the data sets, or rules, are stored in the data array 290 such that the prioritization block 260 simply selects the first matching rule within the set of rules that compare favorably with the key value 252.

Preferably, the packet classification engine includes an output register or result register in which the prioritization block 260 stores the result corresponding to the preferred matching data set or rule. More preferably, the result register is part of a result buffer 212 that allows a number of results to be stored while awaiting retrieval by the processor requesting packet classification. The result buffer 212 may be a part of a lookup port 210 that also includes a request buffer 215. The result buffer 212 stores a number of results, and may also include a result ready signal 214 that is asserted when the result buffer contains at least one result 213. The processor that requested the packet classification is notified by the result ready signal 214 and reads the result 213 from the result buffer 212.

The request buffer 215 included in the lookup port 210 allows a number of packet classification requests to be buffered and executed as bandwidth allows. A request ready signal 216 indicates that there is space within the request buffer 215 such that the system is able to receive additional packet classification requests. A received request 217 is stored in the request buffer 215 which may be a FIFO or random access buffer depending on the particular implementation.

The packet classification engine may include more than one lookup port, or request interface. FIG. 3 illustrates a system that includes a first lookup port 210 and a second lookup port 220, where the second lookup port 220 includes a result buffer 222 with a corresponding result ready signal 224 that notifies the requesting entity when the result 223 is ready for retrieval. Similarly, the lookup port 220 includes a request buffer 225 that asserts a request ready signal 226 to notify external processors that it is capable of accepting an additional request 227.

The depth of the request buffers 215 and 225 in relation to the depth of the result buffers 212 and 222 may vary based on the specifics of a particular system. Preferably, the depth of the result buffer in the lookup port is larger than the depth of the request buffer such that a system requesting packet classification may issue a number of requests, allowing the results to be built up in the result buffer before retrieval. Typically, the number of bits required to store a request is greater than the number of bits required to store a result.

The format of requests 217 and 227 stored within the request buffers 215 and 225 may vary based on the type of packet being classified. For example, a packet being transmitted in a particular system using a particular protocol may include a larger key value for matching purposes than a different communication system using a different protocol. However, preferably, the structure of the requests received by the request buffer is uniform in the sense that routing of the request data within the packet classification engine is standardized for all types of requests. Each request must include the required key data set 252 and enough information to allow for location and selection of the appropriate set of rules from the data array 290. The data selection information may be included within the key, or may be provided in addition to the key.

In order to allow rules in the data array to be configured at initialization or reconfigured during operation of the packet classification engine, the packet classification engine preferably includes a control processor interface 280. The control processor interface allows an external processor to modify data sets, or rules, in the data array 290.

In order to allow each of the control processor interface 280 and the two lookup ports 210 and 220 to interact and use the data array 290 without interfering with the operation of the others, the packet classification engine preferably includes a scheduler 240. The scheduler 240 is operably coupled to each of the lookup ports 210 and 220 and the control processor interface 280, and controls ordering of execution of comparison requests and modifications to the data sets in the data array 290. For example, assuming that a number of requests are stored in the request buffers 215 and 225, and the control processor interface indicates that an external processor wishes to modify some of the data sets in the data array 290, the scheduler may alternate accesses between these three entities to ensure that each entity receives enough bandwidth to ensure proper system operation. Because the scheduler 240 knows when the control processor interface 280 is modifying a rule within the data array 290, it can ensure that a classification request is not processed while the modification is taking place. This guarantees that the comparison performed by the comparison block 300 is using the correct set of rules, rather than rules that are in the process of being modified.

In the case where the modification of a rule set by the control processor interface 280 requires a number of operations that may be split up by the scheduler 240 and interspersed with the execution of requests from one or more of the request buffers, an enable bit may be included in each rule set. If the enable bit is set to a particular state, indicating that the rule is invalid, the comparison block 300 will reject any comparison with that particular rule or rule set. Once the control processor 280 has completed the modifications to the rule or rule set within the data array 290 it can modify the enable bit to notify the system that the rule or rule set is now valid.

In order to allow multiple iterations of comparisons to occur in the comparison block for a particular key 252, the packet classification engine preferably includes a sequencer 250. The sequencer 250 is operably coupled to the data selection block 270, the scheduler 240, and the prioritization block 260. The sequencer 250 receives indications from the scheduler 240 that a new key has been received and is to be compared with a certain rule set. The sequencer passes the start index to the lookup table 272 to select the first address offset that is passed to the data array 290. Preferably, the sequencer 250 controls which set of row selection data is provided to the data array 290 by choosing between the output of the lookup table 272 and the output of the linked list 274. A multiplexor 276 may be employed to perform this selection.

Once the first set of rules 292 has been selected from the data array 290 and provided to the comparison block 300 for comparison with the key 252, the sequencer receives an indication from the prioritization block 260 as to whether or not a matching rule has been found for the key 252. If a matching rule has been determined, the sequencer 250 notifies the scheduler that it is prepared to initiate the next comparison operation, as the most recent operation has completed. In the case where a matching rule has not been determined by the first iteration, the sequencer selects a new set of rule selection signals via the data selection block 270 such that a new set of rules 292 is provided to the comparison block 300. Preferably, this is accomplished by delivering the output of the linked list 274 to the data array 290. The operation of the linked list 274 was discussed in more detail above. If it is determined that this second set of rules also does not provide a matching rule for the key 252, the sequencer can continue to utilize the linked list 274 to select additional sets of rules from the data array 290 for comparison.

Preferably, all the components illustrated in FIG. 3 are implemented on a single integrated circuit that is dedicated to performing packet classification operations. The processing required to manufacture such an integrated circuit may include implementing logic on DRAM process, DRAM in a logic process, or a mixed process. Utilizing current DRAM technology, a massively parallel packet classification engine can be constructed based on the teachings herein. Such a classification engine allows for a plurality of packet classification rules to be compared with information from the packet in parallel in a cost-efficient, timely manner.

In some embodiments, a single key value that describes a data communication packet may be used to determine more than one rule for that particular packet. For example, there may be a set of rules stored in the data array 290 that deal with routing of certain types of packets, and another set of rules that deals with the billing operations for the same types of packets. In such a system, the same key value may be used to determine more than one set of results for a particular packet. In such instances, the rule set stored in the data array corresponding to that type of packet may include two different classes of rules, where each class is used for one type of result. In such instances, the same key value may be used to determine a preferred rule in each of the two classes.

In one example, the data array 290 stores a set of rules for a certain set of IP packets, where packets having a certain destination address are classified by a first routing rule. Similarly, the packets that originate from a first source address are billed at a first rate, whereas packets originating from a second source address receive a second billing rate. In such a case, the data array 290 may store a first class of rules for that type of IP packet that corresponds to routing information, whereas a second class concerns billing operations. This allows the data array 290 to store rules for that particular packet in a more efficient manner than if the billing information and the routing information were to be combined into a single set of rules.

In the case where different classes of rules for a particular key value are stored in the data array 290, the number of iterations through the comparison block 300 will be determined based on whether or not a matching rule has been found for each class of rules within the data array 290. Thus, if a single key 252 is used to determine two matching rules, one from each of two classes, the sequencer 250 will continue to select sets of rules corresponding to that key 252 until the prioritization block 260 has indicated that a match has been determined for a rule in each of the two classes.

One or more bits within the rule structure in the data array 290 may be used to distinguish to between different classes of rules. It should be understood that a number of different classes may exist for a particular type of packet, and the prioritization block 260 may determine a preferred rule for each of these different classes before providing the corresponding result data to the result buffer.

Slower packet rates will allow for more exhaustive comparisons, whereas higher speed packet rates will allow fewer iterations through the rule sets in the data array 290. In many instances, security issues are more restrictive closer to end stations in communication systems, and therefore more rules and lower speed interfaces will be present. Thus, more time will be available to perform a more exhaustive search for the appropriate rule within the data array 290. Processing at the higher speed interfaces within the data communication system can be done using a simplified set of rules that are easily and quickly compared, allowing for high-speed packet routing. It should be noted that all of the speed concerns are based on speed limitations within the packet classification engine, and as faster memory structures and higher speed fabrication processes are developed, more exhaustive searches will be possible at high speed interfaces.

In some instances, the number of rules required to accurately classify a packet in the data communication system may be a subset of the minimum set of rules read from the data array 290 in a single iteration. In such instances, some of the bits within the rule set may be used to distinguish between different sets of rules such that a single set of rules read from the data array 290 actually includes rules from a number of different rule sets. By including an equal comparator within the comparison block 300, a set of bits within the key 252 can be utilized to take advantage of this additional level of granularity within the data array 290.

Figure 4:
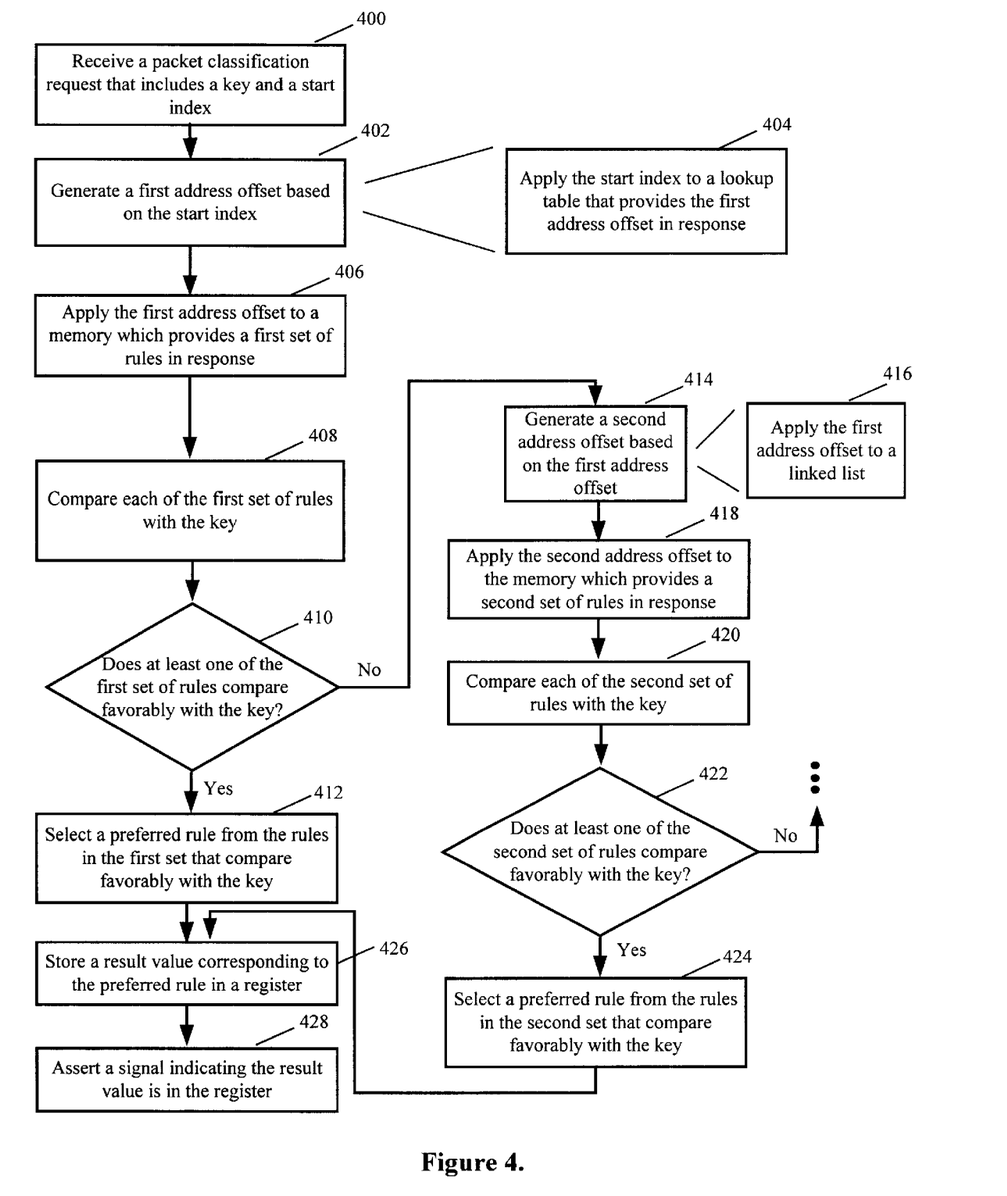
FIG. 4 illustrates a flow diagram of a method for packet classification in accordance with the present invention.

FIG. 4 illustrates a flow diagram of a method for packet classification. At step 400, a packet classification request is received, where the packet classification request includes a key and a start index. At step 402, a first address offset is generated based on the start index. Preferably, at step 404, the first address offset is derived by applying the start index to a lookup table. More preferably, the lookup table is accessible such that the first address offset may be altered in a simple manner that allows a corresponding start index to be remapped to a new address offset.

At step 406, the first address offset is applied to a memory that provides a first set of rules in response. Preferably, the memory structure is as was described with respect to FIGS. 1 and 3 such that the memory stores a plurality of rules. More preferably, the plurality of rules correspond to handling of data packets in a data communications system.

At step 408, each of the first set of rules is compared with the key to determine whether or not the key matches one or more of the rules in the first set of rules. Preferably, the comparisons are performed in parallel or by taking advantage of the burst capabilities of the DRAM as described earlier. At step 410, it is determined whether or not at least one of the first set of rules compares favorably with the key. If a favorable comparison is determined at step 410, the method proceeds to step 412, where a preferred rule is selected from the rules in the first set that compared favorably with the key. Preferably, selecting the preferred rule is accomplished by structuring the rules in an ordered pattern in the memory such that the preferred rule is the first rule in the ordered pattern that compares favorably with the key.

If, at step 410, it is determined that none of the first set of rules compare favorably with the key, the method proceeds to step 414 where a second address offset is generated based on the first address offset. Preferably, this second address offset generation is performed at step 416 using a linked list. At step 416, the first address offset is applied to the linked list, which returns the second address offset in response. Preferably, the linked list is configurable as was described with respect to FIG. 3.

At step 418, the second address offset is applied to the memory, which provides a second set of rules in response. At step 420, each of the rules within the second set of rules is compared with the key. At step 422, it is determined whether or not any of the rules in the second set of rules compare favorably with the key. If none of the rules in the second set compare favorably with the key, the process preferably repeats such that a third set of rules will be retrieved from the memory for comparison. Alternatively, if the linked list is no longer supplying additional address offsets to retrieve additional rule sets, the system may return a value indicating that no match has been achieved. At step 424, if it is determined at step 422 that one or more rules in the second set of rules compared favorably with the key, a preferred rule will be selected from the rules in the second set that compare favorably with the key. As before, it is preferable that this selection of the preferred rule is accomplished based on the ordering of the rules within the memory structure.

At step 426, a result value corresponding to the preferred rule is stored in a register. Preferably, each of the rules stored in the memory has accompanying result data stored with it in the memory. This result data is generated by the packet classification system in response to the packet classification request. The result value may be used for functions such as routing of the packet, billing, or other related operations concerning the packet. At step 428, a signal is asserted indicating that the result value is stored in the register. The asserted signal notifies the processor that requested the packet classification to fetch the result value stored in the register.

Figure 5:
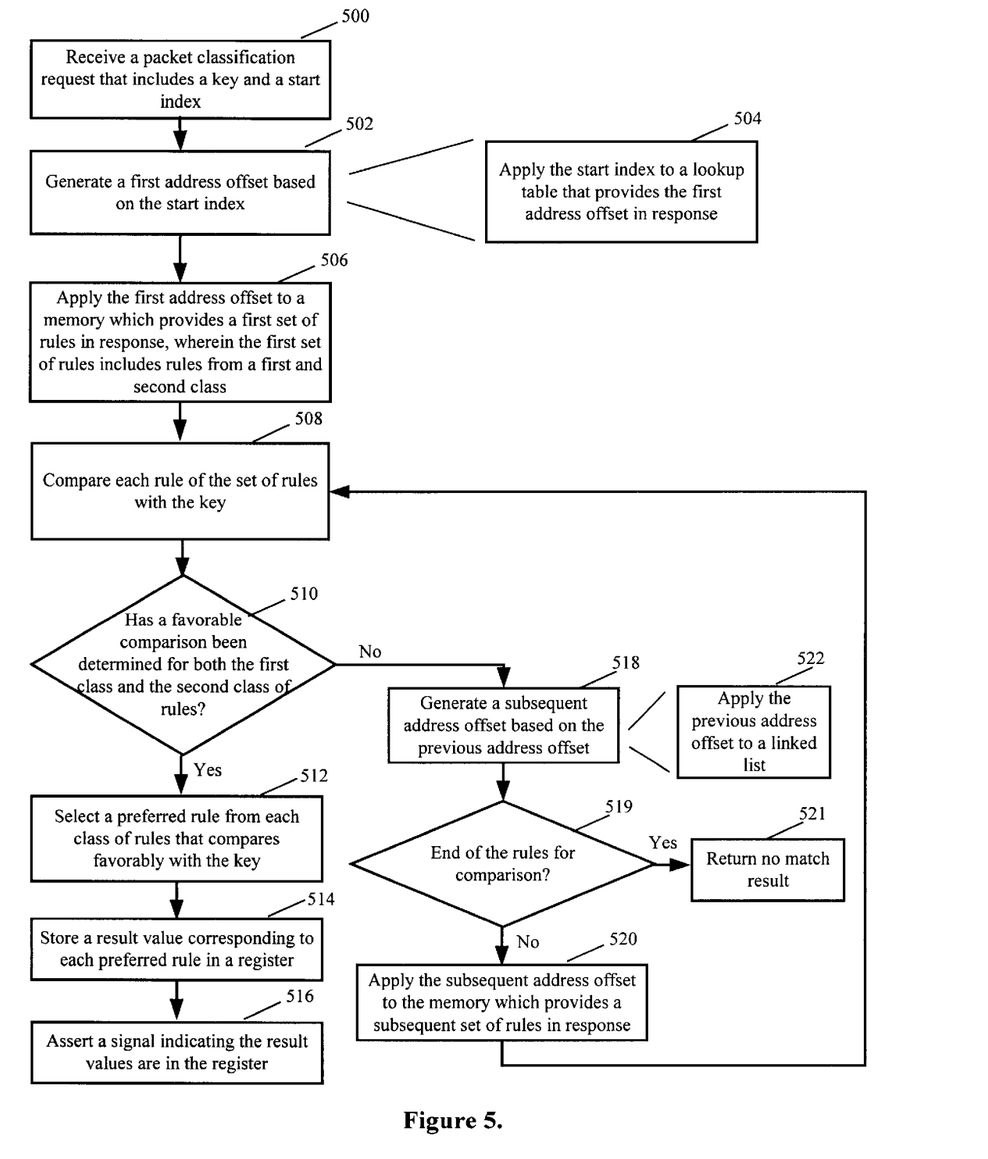
FIG. 5 illustrates a flow diagram of another method for packet classification in accordance with the present invention.

FIG. 5 illustrates a flow diagram of another method for packet classification. At step 500, a request for a packet classification is received that includes a key and a start index. Step 500 is similar to step 400 of FIG. 4. At step 502, a first address offset is generated based on the start index, which may be accomplished according to step 504. Steps 502 and 504 are similar to steps 402 and 404 of FIG. 4.

At step 506, the first address offset is applied to a memory that provides a first set of rules in response. In the method of FIG. 5, the first set of rules includes rules from a first class and from a second class. Rules in the first and second class differ in that each is preferably for a different type of packet classification, however both utilize the same key to determine whether or not the rules match. This is similar to the situation described with respect to FIG. 3, where rules from more than one class are included in the memory array. The example given with respect to FIG. 3 included one class of rules for billing, and another class of rules for packet forwarding.

At step 508, each rule of the first set of rules is compared with the key. At step 510, it is determined whether a favorable comparison has been determined for both of the first class and the second class of rules. At step 512, selection of the preferred rules for each class is performed. When at least one of the rules from the first class of rules and the first set of rules compares favorably with the key, a preferred first class rule is selected from the first class rules in the first set of rules that compare favorably with the key. Similarly, when at least one of the rules from the second class of rules in the first set of rules compares favorably with the key, a preferred second class rule is selected from the second class rules in the first set of rules that compared favorably with the key.

At step 514, a result value corresponding to each preferred rule is stored in a register. This is similar to step 426 of FIG. 4, however a register is included for each class of rules. At step 516, a signal indicating that the result values are stored in the register is asserted, thus notifying the requesting processor that the resultant data is ready to be retrieved.

If it is determined at step 510 that a favorable comparison has not been determined for both the first and the second classes of rules, the method proceeds to step 518 where a subsequent address offset is generated based on the previous address offset. After the first iteration, the first address offset is used to generate the second address offset. Preferably, the generation of the subsequent address offset is accomplished by using a linked list at step 522.

At step 519, it is determined if the rules for comparison with this key value have been exhausted. This may be determined by the linked list used at step 522, which would return an indication that the end of the list has been reached. If it is determined that the end of the rules for comparison has been reached, the comparison stops and a result indicating that no match was determined for one or more of the classes of rules at step 521. If more rules are available for comparison, the method proceeds to step 520.

At step 520, the subsequent address generated at step 518 is applied to the memory, which provides a subsequent set of rules in response. Specifically, after the first iteration, the subsequent set of rules generated is the second set of rules. At this point the method returns to step 508 where each rule within the set of rules is compared with the key value. The method then proceeds once again to step 510 where it is determined whether or not a match has been determined for both the first and second class of rules. Once again, if a match has not yet been determined for both classes the method proceeds through the loop beginning with step 518 where additional rules are obtained from the memory in an attempt to determine a match for both classes. Once both classes have produced matching rules, the method stores the corresponding results in the respective registers and signals the processor that the packet classification is complete.

The present invention provides a method and apparatus for performing packet classification in a data communications system. It should be understood that the teachings included herein are applicable to any type of classification or filtering operation that is performed using complex rules that may be numerous and applied to various sets of data to determine whether or not a match has occurred. By utilizing large memory structures such as DRAMs, a cost-efficient, highly-parallelized comparison engine can be implemented. The classification engine is speed independent in that it can be modified to operate in a environment where a single iteration through the set of rules is allowed, or multiple iterations may be performed at slower interface boundaries.

The classification engine described herein is able to handle multiple independent classification tables that can accommodate thousands of communication interfaces where each requires an independent type of classification. The structure of the key values and the rules for these different interfaces are mapped into the memory structure and the comparison block in such a way that allows for the appropriate data components of both the key and the rules to be compared in a flexible manner to satisfy the needs of many different protocols. By utilizing a lookup table to select the set of rules for a particular key value, the mapping of the key value to a set of rules can be modified in a simple manner by modifying an entry within the lookup table. Similarly, a linked list allows for additional iterations of rules to be selected from the memory array based on the previous set of rules selected.

The memory usage in the system is linear based on the number of rules stored. As memory fabrication processes continue to advance, the number of rules that may be stored in the classification engine will also be expanded. The number of rules that can be stored in such a packet classification engine is much greater than the number of rules that could be practically implemented in prior art systems.

Because of the massively parallel comparison performed using the DRAM memory structure, in typical applications the matching rule can often be determined in a single memory access. This is advantageous over prior art solutions that require multiple memory cycles to perform a single classification based on a similar rule set. By storing the rules in a memory structure such as a DRAM memory structure, it is simple to alter the rules dynamically. A change in any one or more rules within the data communication system can be implemented while the system is up and running without causing interference that would degrade the system.

It should be understood that the implementation of variations and modifications of the invention and its various aspects will be apparent to those of ordinary skill in the art, and that the invention is not limited to the specific embodiments described. For example, the memory structure utilized to store the plurality of data sets, or rules, may be another type of memory structure other than an SDRAM. It is therefore contemplated to cover by the present invention, any and all modifications, variations, or equivalents that fall within the spirit and scope of the basic underlying principles disclosed and claimed herein.

What is claimed is:

1. A packet classification engine comprising:
    a memory, wherein the memory stores a plurality of rules, wherein each rule of the plurality of rules defines a region in an N-dimensional space, wherein the memory is operably coupled to receive rule selection signals, wherein a first set of rule selection signals selects a selected set of rules of the plurality of rules, wherein the selected set of rules includes at least one rule;
    a comparison block operably coupled to the memory, wherein the comparison block is operably coupled to receive a key, wherein the key defines a point within the N-dimensional space, wherein the comparison block compares the key to the selected set of rules, wherein when the comparison block determines a favorable comparison between the key and a matching rule within the selected set of rules, the comparison block generates an indication of the favorable comparison, wherein the favorable comparison indicates that the point defined by the key is within the region defined by the matching rule; and
    a prioritization block operably coupled to the comparison block, wherein the prioritization block receives indications of favorable comparisons and determines a preferred favorable comparison from the indications, wherein the preferred favorable comparison determines a preferred rule of the plurality of rules.

2. The packet classification engine of claim 1 further comprises a key generation block operably coupled to the comparison block, wherein the key generation block extracts fields from a header of a data communication packet and generates the key based on the fields.

3. The packet classification engine of claim 1 further comprises a result register, wherein each rule stored in the memory includes result data, wherein the prioritization block stores in the result register result data corresponding to the preferred rule.

4. The packet classification engine of claim 1, wherein the memory is a dynamic random access memory (DRAM) that provides at least one row of data that includes the selected set of rules in response to the first set of rule selection signals.

5. A packet classification engine, comprising:
- a data array, wherein the data array stores a plurality of data sets;
- a data selection block operably coupled to the data array, wherein the data selection block selects a selected set of data sets from the plurality of data sets based on data selection information, wherein the selected set of data sets includes at least one data set;
- a comparison block operably coupled to the data array, wherein the comparison block is operably coupled to receive a key data set, wherein the comparison block compares the key data set with each data set of the selected set of data sets to generate comparison results; and
- a prioritization block operably coupled to the comparison block, wherein the prioritization block prioritizes the comparison results to determine a preferred matching data set having a favorable comparison to the key data set.

6. The packet classification engine of claim 5 further comprises a result buffer operably coupled to the prioritization block, wherein each of the plurality of data sets includes result data, wherein result data corresponding to the preferred matching data set is stored in the result buffer.

7. The packet classification engine of claim 6, wherein the data selection block further comprises a lookup table operably coupled to receive a start index as part of the data selection information, wherein the lookup table generates an offset based on the start index, wherein the offset is used to determine the selected set of data sets.

8. The packet classification engine of claim 7, wherein the data selection block further comprises a linked list operably coupled to receive the offset, wherein the linked list provides a subsequent offset in response to the offset, wherein the subsequent offset is used to select a subsequent set of data sets for comparison with the key data set.

9. The packet classification engine of claim 5, wherein the data array further comprises a random access memory, wherein the data selection block selects a row within the random access memory, wherein data sets stored in the row are provided to the comparison block.

10. The packet classification engine of claim 9, wherein the data sets stored in the random access memory include rules corresponding to handling of data packets in a data communications system.

11. The packet classification engine of claim 5, wherein the comparison block further comprises a plurality of comparators that are configurable to allow comparison of the key data set with the selected set of data sets, wherein outputs of the plurality of comparators are merged to produce the comparison results.

12. The packet classification engine of claim 11, wherein adjacent comparators of the plurality of comparators are concatenated to perform comparisons of a concatenated comparison width that is greater than a maximum non-concatenated width associated with non-concatenated comparisons utilizing non-concatenated comparators.

13. The packet classification engine of claim 11, wherein the plurality of comparators includes multiple comparators for a particular portion of the key data set and a corresponding portion of each data set of the selected set of data sets, wherein an partial comparison result is selected from results of the multiple comparators based on comparison selection data in one of the key data set and the selected set of data sets.

14. The packet classification engine of claim 11, wherein the plurality of comparators includes at least one of equality comparators, range comparators, mask and compare comparators, and mask and range comparators.

15. The packet classification engine of claim 5 further comprises a control processor interface operably coupled to the data array, wherein the control processor interface allows an external processor to modify data sets in the data array.

16. The packet classification engine of claim 5 further comprises a first request interface operably coupled to the comparison block and the data selection block, wherein the first request interface is operably coupled to receive comparison requests, wherein each of the comparison requests includes a corresponding key data set and corresponding data selection information.

17. The packet classification engine of claim 5, wherein the request interface further comprises a request buffer, wherein the request buffer stores pending comparison requests.

18. The packet classification engine of claim 17 further comprises:
- a control processor interface operably coupled to the data array, wherein the control processor interface allows an external processor to modify data sets in the data array; and
- a scheduler operably coupled to the control processor interface, the request interface, and the data selection block, wherein the scheduler controls ordering of execution of comparison requests and modifications to the data sets in the data array.

19. The packet classification engine of claim 18 further comprises a sequencer operably coupled to the prioritization block, the scheduler, and the data selection block, wherein the sequencer provides the data selection information to the data selection block based on whether the prioritization block has determined the preferred matching data set.

20. The packet classification engine of claim 18 further comprises a second request interface operably coupled to the comparison block and the scheduler, wherein the second request interface is operably coupled to receive additional comparison requests for execution.

21. The packet classification engine of claim 5, wherein the packet classification engine is implemented as an integrated circuit.

22. A method for packet classification, comprising:
- receiving a packet classification request, wherein the packet classification request includes a key and a start index;
- generating a first address offset based on the start index;
- applying the first address offset to a memory, wherein the memory stores a plurality of rules, wherein the memory provides a first set of rules in response to the first address offset;
- comparing each rule of the first set of rules with the key; and
- when at least one of the rules in the first set of rules compares favorably with the key, selecting a preferred rule from rules in the first set of rules that compare favorably with the key.

23. The method of claim 22 further comprises:
- storing a result value corresponding to the preferred rule in a register, wherein each rule of the plurality of rules stored in the memory includes a corresponding result value; and
- asserting a signal indicating that the register contains the result value.

24. The method of claim 22 further comprises:
- when all of the rules in the first set of rules compares unfavorably with the key:

generating a second address offset based on the first address offset;

applying the second address offset to the memory, wherein the memory provides a second set of rules in response to the second address offset;

comparing each rule of the second set of rules with the key; and when at least one of the rules in the second set of rules compares favorably with the key, selecting the preferred rule from rules in the second set of rules that compare favorably with the key.

25. The method of claim 24, wherein generating the second address offset further comprises applying the first address offset to a linked list, wherein the linked list provides the second address offset in response to the first address offset.

26. The method of claim 22, wherein selecting the preferred rule further comprises structuring the rules in an ordered pattern in the memory such that the preferred rule is a first rule in the ordered pattern that compares favorably with the key.

27. The method of claim 22, wherein generating the first address offset further comprises applying the start index to a lookup table, wherein the lookup table returns the first address offset in response to the start index.

28. A method for packet classification, comprising:

receiving a packet classification request, wherein the packet classification request includes a key and a start index;

generating a first address offset based on the start index;

applying the first address offset to a memory, wherein the memory stores a plurality of rules, wherein the plurality of rules includes at least a first class of rules and a second class of rules, wherein the memory provides a first set of rules in response to the first address offset, wherein the first set of rules includes rules from the first class and the second class;

comparing each rule of the first set of rules with the key;

when at least one of the rules from the first class of rules in the first set of rules compares favorably with the key, selecting a preferred first class rule from first class rules in the first set of rules that compare favorably with the key;

when at least one of the rules from the second class of rules in the first set of rules compares favorably with the key, selecting a preferred second class rule from second class rules in the first set of rules that compare favorably with the key; and when at least one of the preferred first class rule and the preferred second class rule is not selected based on comparison of the key with the first set of rules:

generating a second address offset based on the first address offset;

applying the second address offset to the memory, wherein the memory provides a second set of rules in response to the second address offset, wherein the second set of rules includes rules from the first class and the second class; and comparing each rule of the second set of rules with the key, wherein when a favorable comparison is determined for a rule of a class for which a preferred rule has not been selected, selecting the preferred rule from rules in the second set of rules that compare favorably with the key.

29. The method of claim 28, wherein generating the second address offset further comprises applying the first address offset to a linked list, wherein the linked list provides the second address offset in response to the first address offset.

30. The method of claim 28, wherein selecting a preferred rule for each of the first class and the second class further comprises structuring the rules in an ordered pattern in the memory such that the preferred rule for each of the first class and the second class is a first rule, for each respective class, in the ordered pattern that compares favorably with the key.

31. The method of claim 28, wherein generating the first address offset further comprises applying the start index to a lookup table, wherein the lookup table returns the first address offset in response to the start index.

* * * * *